United States Patent [19]
Karp

[11] Patent Number: 5,647,993
[45] Date of Patent: Jul. 15, 1997

[54] MAGNETIC FILTER ENHANCEMENT APPARATUS AND METHOD

[76] Inventor: David P. Karp, 2 Orchard Dr., Durham, N.H. 03824

[21] Appl. No.: 514,607

[22] Filed: Aug. 14, 1995

[51] Int. Cl.$^6$ .................................................. B01D 35/06
[52] U.S. Cl. .......................................... 210/695; 210/223
[58] Field of Search ...................................... 210/222, 223, 210/695; 335/304, 305; 184/6.25

[56] References Cited

U.S. PATENT DOCUMENTS

| | | | |
|---|---|---|---|
| 2,760,637 | 8/1956 | Franch | 210/223 |
| 3,460,679 | 8/1969 | Llewellyn . | |
| 4,218,320 | 8/1980 | Liaw . | |
| 4,446,019 | 5/1984 | Robinson . | |
| 4,450,075 | 5/1984 | Krow . | |
| 4,592,836 | 6/1986 | Chiao . | |
| 4,629,558 | 12/1986 | Garrity . | |
| 4,826,592 | 5/1989 | Taylor . | |
| 4,851,116 | 7/1989 | Tomita . | |
| 4,894,153 | 1/1990 | Skirdavani . | |
| 5,078,871 | 1/1992 | McCready . | |
| 5,089,129 | 2/1992 | Brigman | 210/223 |
| 5,273,648 | 12/1993 | Caiozza . | |
| 5,282,963 | 2/1994 | Hull et al. . | |
| 5,345,462 | 10/1994 | Perritt . | |

*Primary Examiner*—Matthew O. Savage
*Attorney, Agent, or Firm*—Stephen G. Matzuk

[57] ABSTRACT

A device surrounding a canister filter providing a magnet having one pole located on the end of the canister at or near the axis of the canister while providing a second pole to the surrounding surface of the canister via a helical metal bar surrounding the canister and conforming thereto. Accordingly, a magnetic field is created within the canister housing to include substantially all of the filter fluid passing through the canister housing. Thus, the invention provides significantly improved filtration of magnetic particles.

8 Claims, 4 Drawing Sheets

MAGNETIC FIELD PLOT - 3 1/2" FILTER
( IN GAUSS )

1

MAGNETIC FILTER ENHANCEMENT APPARATUS AND METHOD

FIELD OF THE INVENTION

The present invention relates to oil filter enhancement, and particularly to apparatus and methods for applying a magnetic field to the disposable, cylindrical automotive filters and the industrial equivalent.

BACKGROUND OF THE INVENTION

Much of the minute abrasive alloy particles produced by wear in engines or other machine apparatus are removed from the immediate site of production by lubrication oil only to be reintroduced as the lubrication fluid is recycled and reapplied onto the site. Most often the lubrication fluid is filtered through a paper, fiber or equivalent filter, such as disposable screw-on canister filters, before being recycled through the lubrication system. However, economically feasible or practical filters have little or no effectiveness for the smaller particles, especially minute abrasive metal particles. Providing a filter or filter system with sufficiently fine filtration would be excessively costly and/or excessively impede the fluid flow, and thus be unacceptable for the majority of the applications.

Attempts to enhance the filtration of canister type filters include simple magnets applied to a single point or area on or about the canister. However, the previously known structures typically provide limited or incomplete magnetic paths and/or produce a magnetic field over an ineffectively small region of the canister filter, producing disappointing and unusable results.

SUMMARY OF THE INVENTION

The enhanced filtration method and apparatus according to the present invention applies a bipolar magnetic field to the outer surface of the filter housing with a substantially axially located magnet pole and the opposite pole magnetically connected to a helical magnetic band disposed about and along the outer surface of the filter housing, thereby magnetically energizing the lubrication fluid path within the filter housing. The magnetic energization is sufficiently intense and widely disposed to attract minute ferrous micro particles to the inner surface of the filter housing in the vicinity of the magnetic field, and remain there as the fluid proceeds through the lubrication system, returning to the site effectively and economically filtered.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
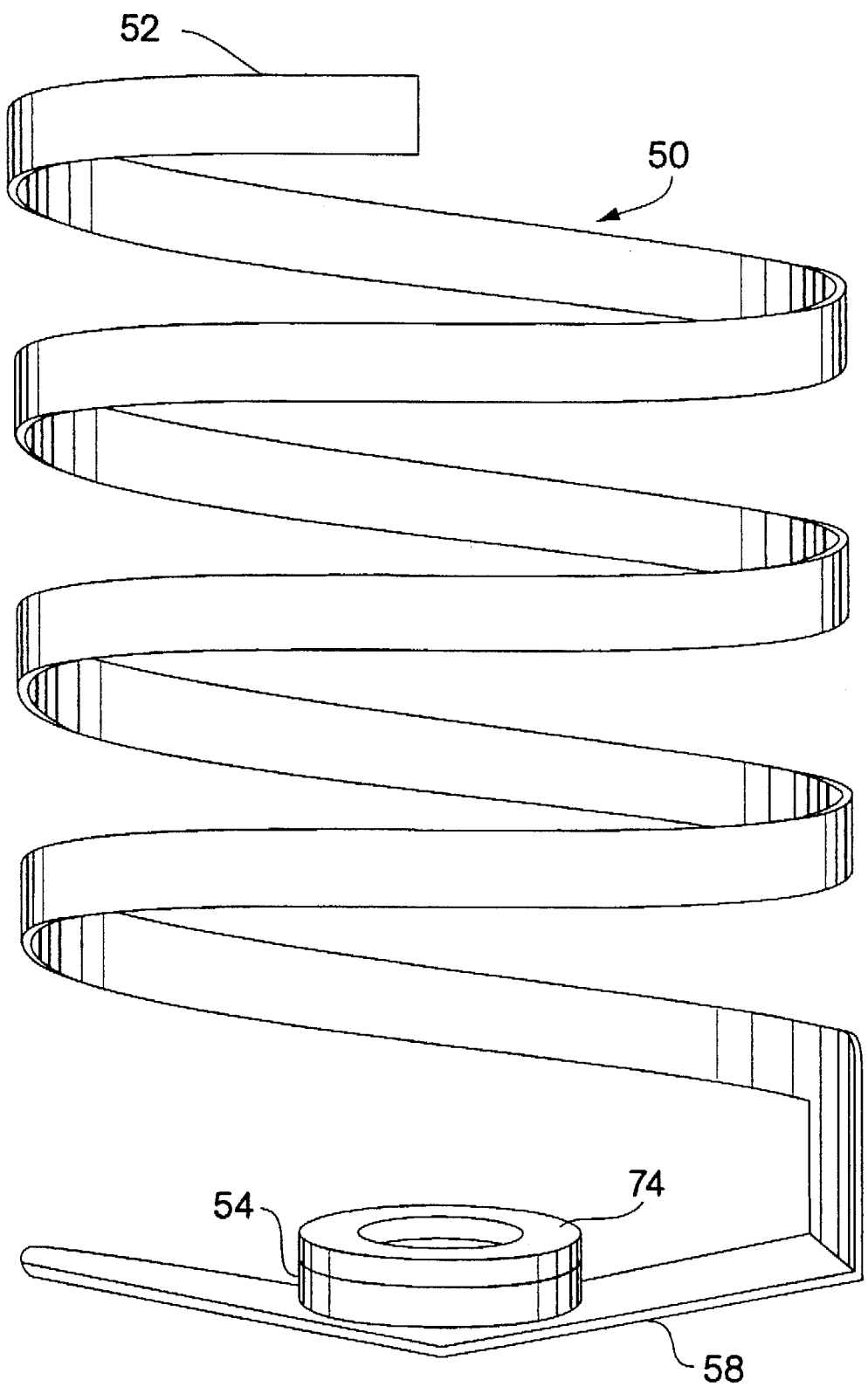
FIG. 1 is a front elevation view of one embodiment of the present invention.
Figure 2:
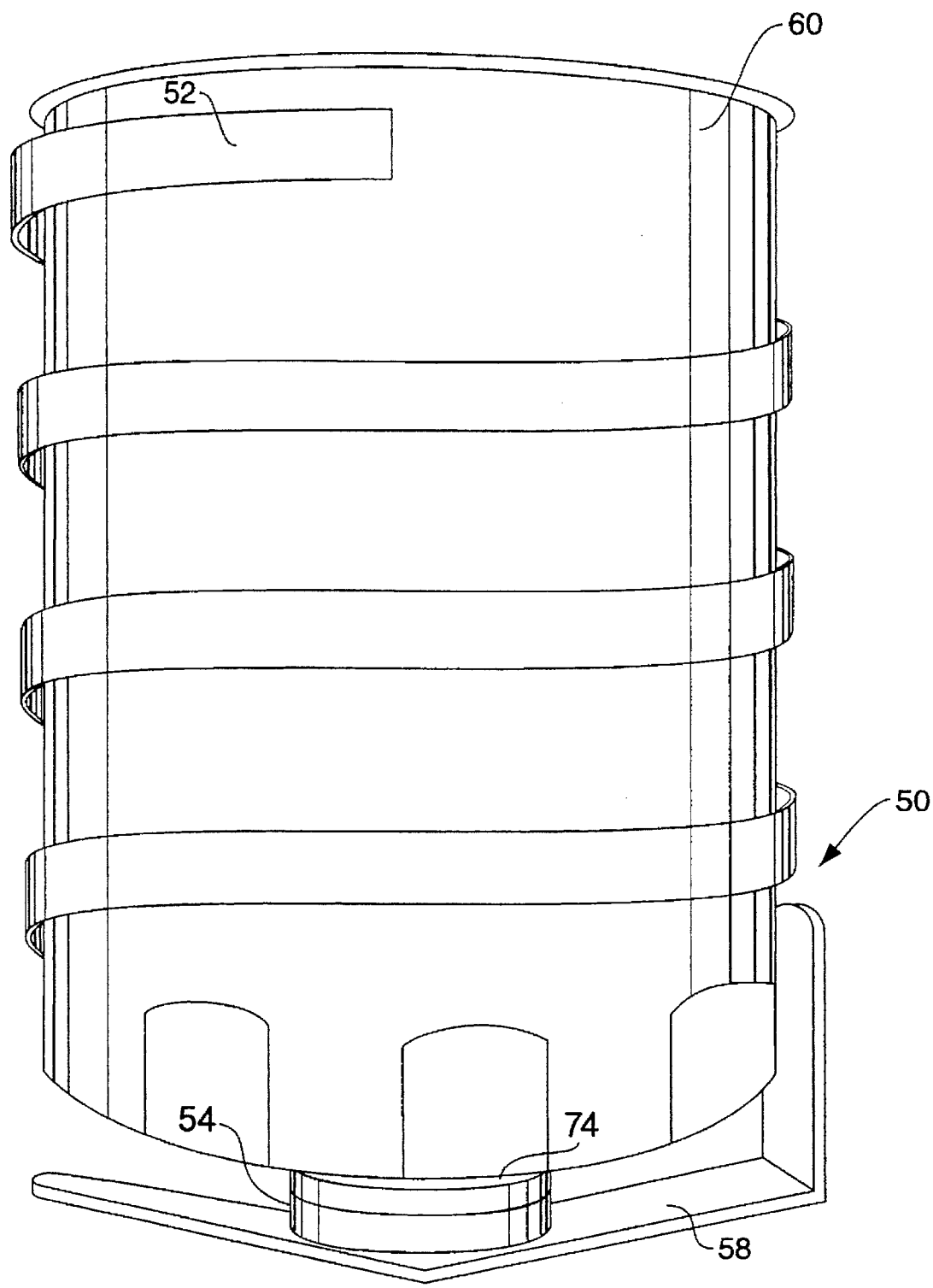
FIG. 2 is a front elevation view of the embodiment of FIG. 1 as applied to a metal canister automotive filter.

A preferred embodiment 50 is shown in FIG. 1 comprising a spiral magnetic metal band 52 of sufficient thickness to provide a magnetic path to the outside of the oil flow enclosed by the canister 60 of FIG. 2 from one pole of the magnet 54 and connecting arm 58. Typically, the band 52 is $1/16$" thick by $3/8$" wide and made of steel. The spiral metal band 52 is helically formed and conforms to the outer surface of the fluid filter 60 to be in close contact with the surface and retained thereon by friction, compressions force or other suitable means. As shown in FIG. 2, the other pole of the magnet 52 confronts the free end of the filter canister 60 approximately at is axis and at the axis of the helical metal band 52. Thus, the embodiment shown present both poles of a magnetic field to the enclosed fluid within the canister 60 and is self-retaining by virtue of the magnet 54 and/or the metal band 52.

Figure 3:
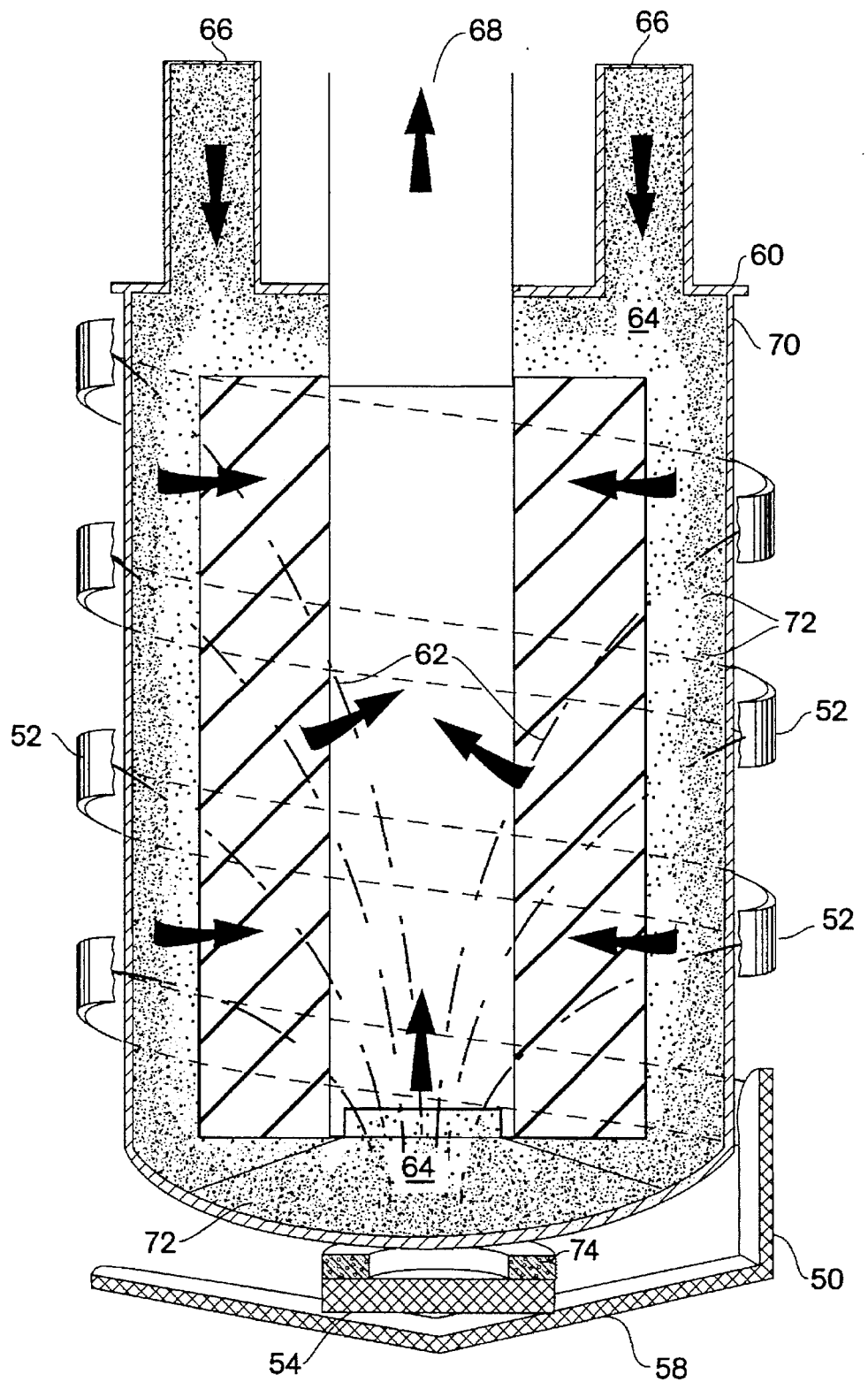
FIG. 3 is a vertical cross section view of the embodiment of FIG. 2.

A cross-sectional view of the embodiment 50 and the canister housing 60 is shown in FIG. 3, wherein a magnetic field is produced between one magnetic pole on the surface of the magnet 54 confronting the canister 60 and the metal band 52, as indicated by the lines of magnetic field, 62. Typically, a filter element 70 is housed within the canister housing 60 into which the fluid is introduced at ports 66 and exhausted at port 68. As shown, the lines of magnetic field include the oil filter 70 included within the canister 60 and through which the majority of the fluid filtered flows. Thus, the magnet magnetically "charges" substantially all of the interior of the filter housing 60 and attracts and retains minute particles along the interior wall of the housing 60, preventing such particles to return to the fluid flow exiting through port 68.

The preferred embodiment of the present invention may be applied to magnetic as well as non-magnetic material walled housings 60, as the magnet typically comprises a high field strength neodymium magnet, or equivalent. The high field strength magnet 54 in combination with the connecting arm and metal band of provide a magnetic field even through a thin steel housing 60 of 0.032" typical thickness. Moreover, the intense magnetic field is resistant to diminution due to flux paths created by the gradual build-up of particles 72 within the housing 60 not tolerated by lesser or otherwise disposed magnetic fields.

Also shown in FIG. 3 is an optional annular anti-vibration pad 74 disposed between the pole of the magnet 54 and the surface of the canister housing 60 to reduce the rubbing between the magnet 54 and the canister housing 60.

Figure 4:
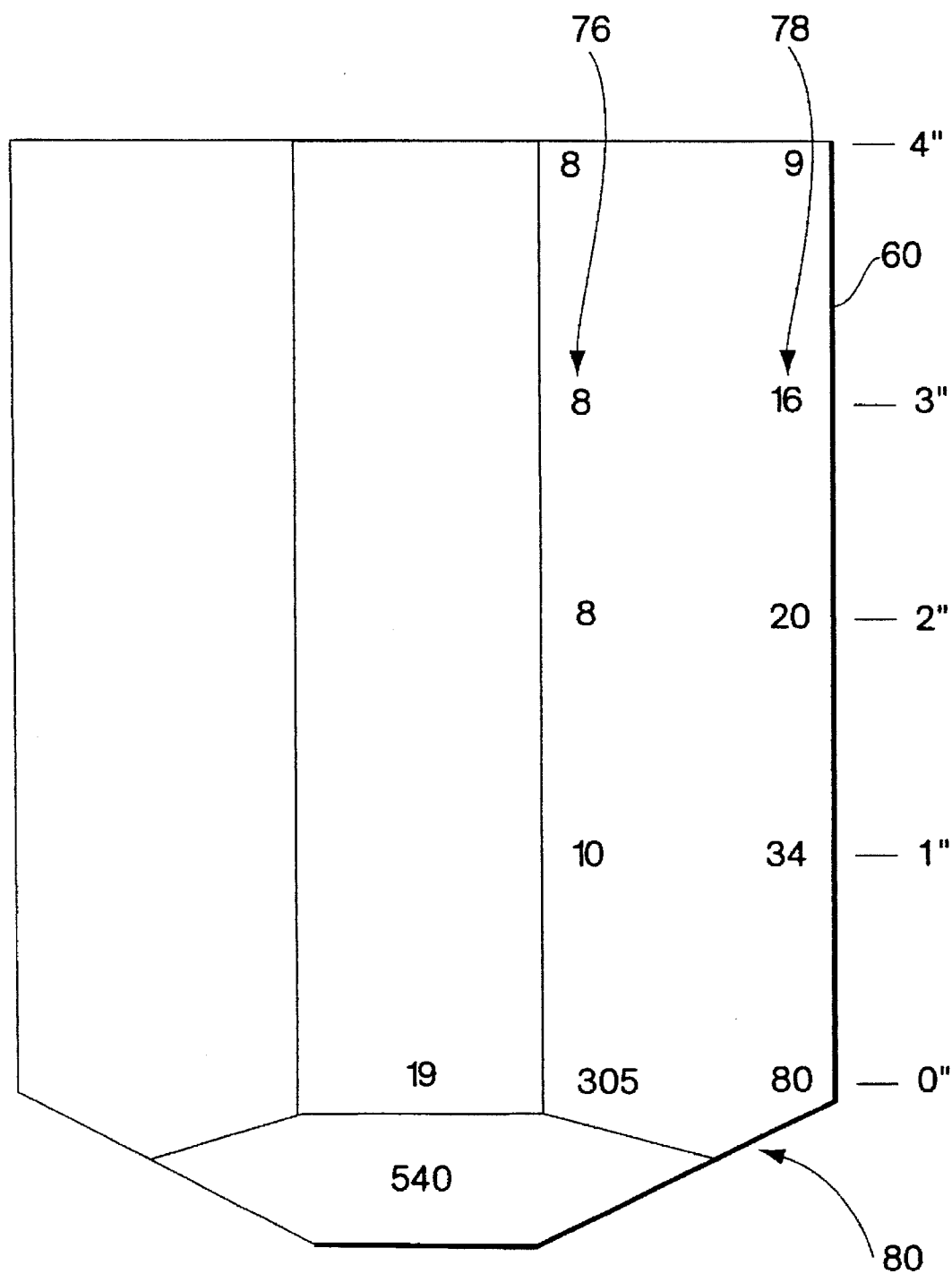
FIG. 4 is plot of the canister internal magnetic field distribution of the embodiment of FIG. 3.

A plot 80 of the magnetic field through the housing 60 and the filter and the fluid 64 is shown in FIG. 4, indicating the coverage of the fluid path and canister interior by the induced magnetic field according to the present invention. The magnetic field is sampled in several locations 78 on the interior of the canister housing 60 and at 76 along the interior oil passage of the filter element 70, showing a 540 gauss magnetic in the interior region near the pole of the magnet 54". As noted by the plot 80, the magnetic field traverses throughout the interior of the filter cartridge 70 to attract the minute metal particles throughout the path of the filter fluid flow in the canister housing 60.

As previously indicated, the magnet need not be positioned exactly on the axis of the canister as some canister configurations may not have an easily accessible axis, at which point, a suitable positioning of the first pole of the magnet relative to the helical metal band surrounding the filter may be made according to the present invention. Moreover, the band dimensions may be changed, such as doubling the thickness, according to the present invention. Further modifications and substitutions by one of ordinary skill is within the scope of the present invention which is not to be limited except by the claims which follow.

What is claimed is:

1. A magnetically enhanced filtration system, comprising:

filter means adapted to receive a particle-laden fluid flow therethrough;

a housing containing said filter means, having a substantially cylindrical exterior surface and an exterior end surface transecting an axis of the cylindrical surface;

a magnet having a first pole confronting said exterior end surface of said housing; and a magnetically conductive band helically disposed about said exterior cylindrical surface and magnetically connected to a second pole of said magnet, disposed to provide a magnetic path through said housing, wherein said magnetic particles are attracted to an inner surface of said housing in the vicinity of said first pole and said magnetically conductive band.

2. The apparatus of claim 1, wherein said first pole is in contact with said housing.

3. The apparatus of claim 1, further including an annular pad disposed between said first pole and said housing.

4. The apparatus of claim 1, wherein said housing comprises a disposable automotive filter having a filter element therein and axially disposed fluid inlet and outlets.

5. The apparatus of claim 1, wherein said housing is a metal housing.

6. The apparatus of claim 1, wherein said magnet comprises a magnet which provides a field strength of at least 540 gauss in at least one place within said filter housing.

7. The apparatus of claim 1, wherein said magnet comprises a neodymium magnet.

8. A method of enhancing magnetic particle filtration in a filter including an elongated filter housing having an inner and an exterior surface, comprising the steps of:

providing a magnet having opposite first and second magnetic poles;

applying said first magnetic pole to a helical path about the exterior surface of said filter housing, wherein said helical path has an axis;

applying said second magnetic pole to the exterior surface of said filter housing at a location substantially on said axis, wherein, said first and second magnetic poles provide a magnetic field within said filter, and said magnetic field attracts magnetic particles to the inner surface of said filter in the vicinity of said applied first and second magnetic poles.

* * * * *